March 26, 1968
L. E. GROSS
3,375,365
AUTOMOBILE LIGHT
Filed Oct. 12, 1965
2 Sheets-Sheet 1
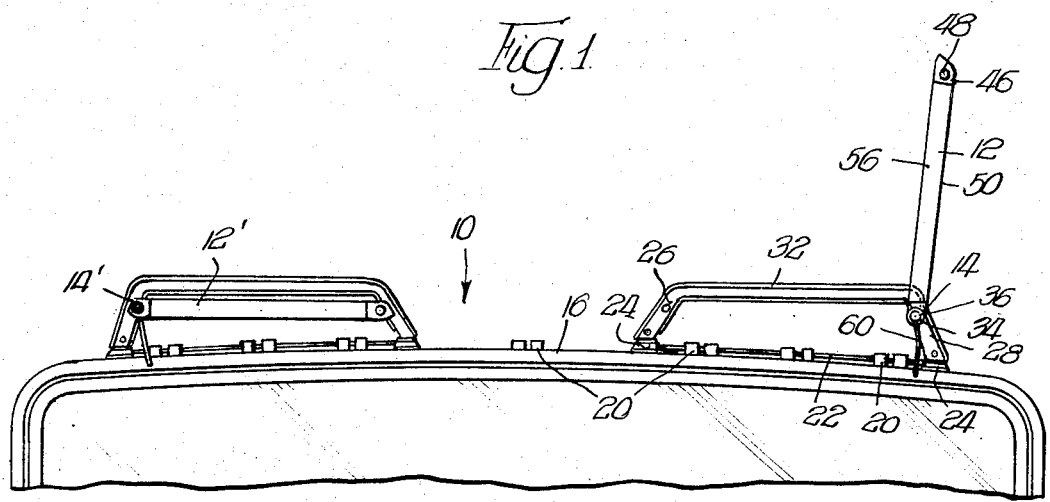
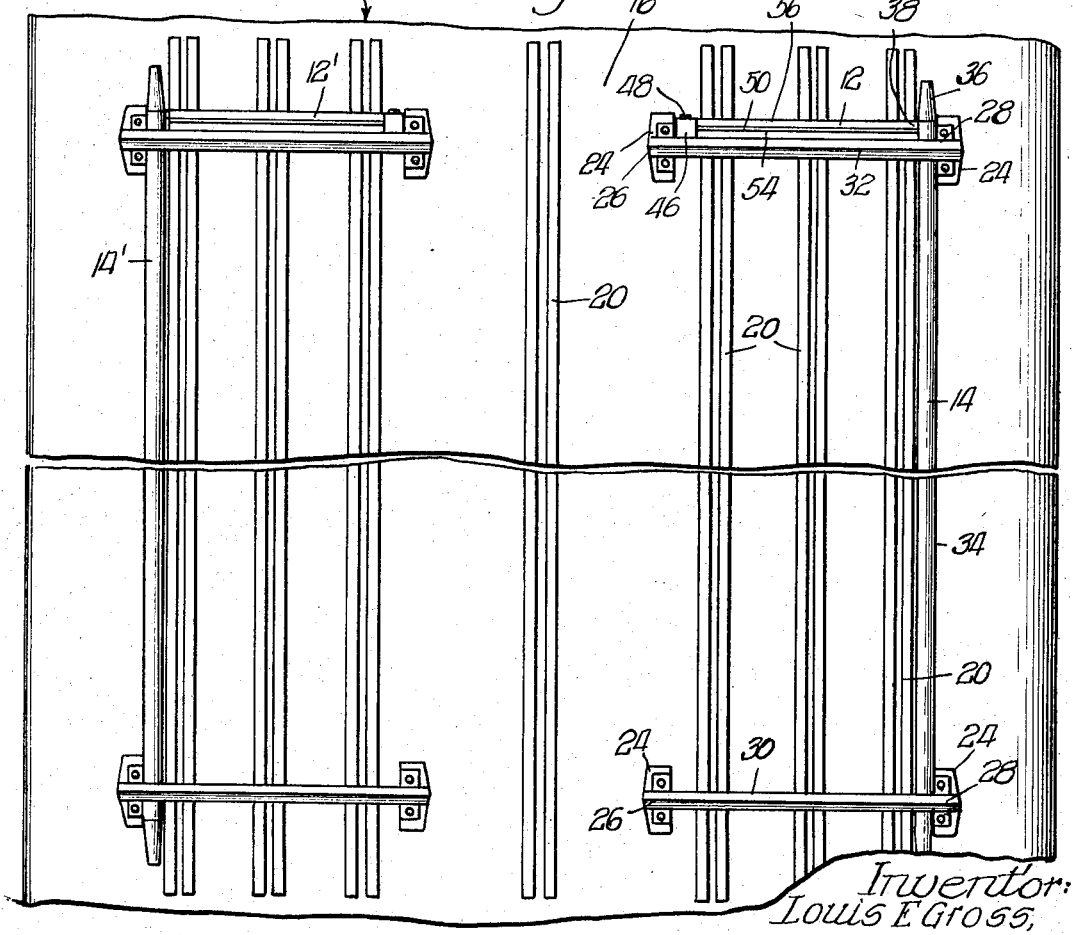
Inventor:
Louis E. Gross,
By Hume, Groen, Clement & Hume
Attys March 26, 1968     L. E. GROSS     3,375,365
AUTOMOBILE LIGHT
Filed Oct. 12, 1965     2 Sheets-Sheet 2
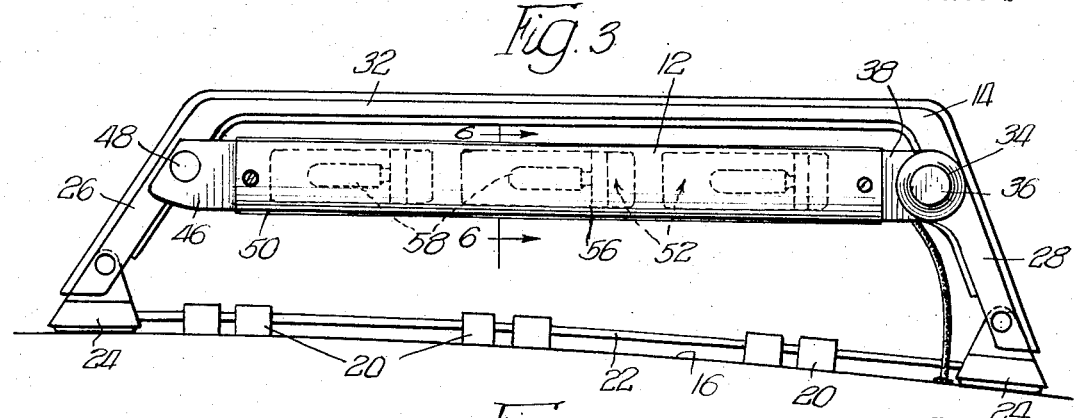
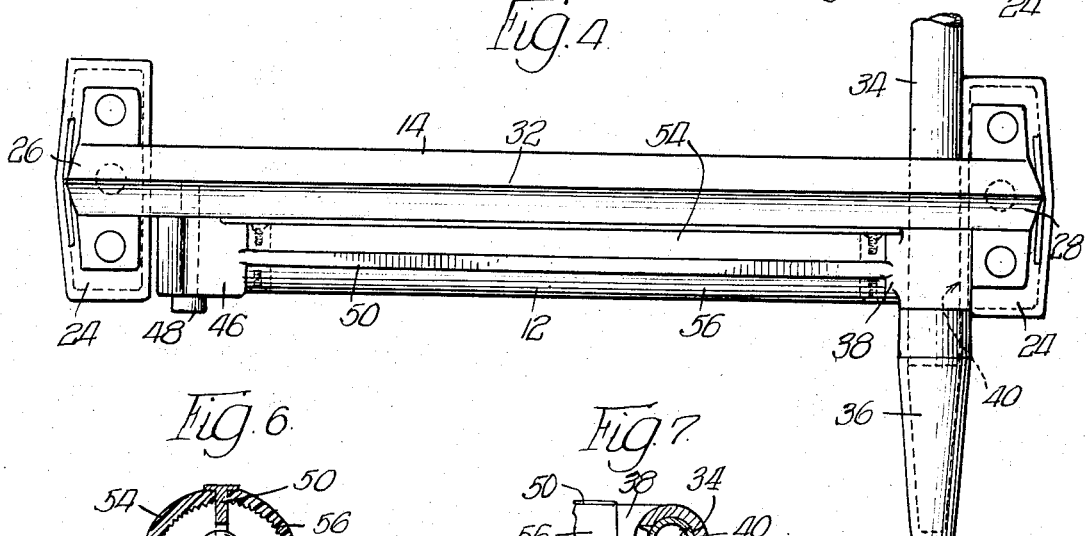
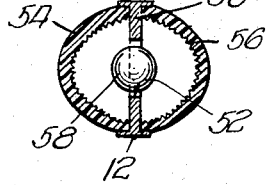
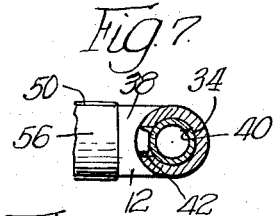
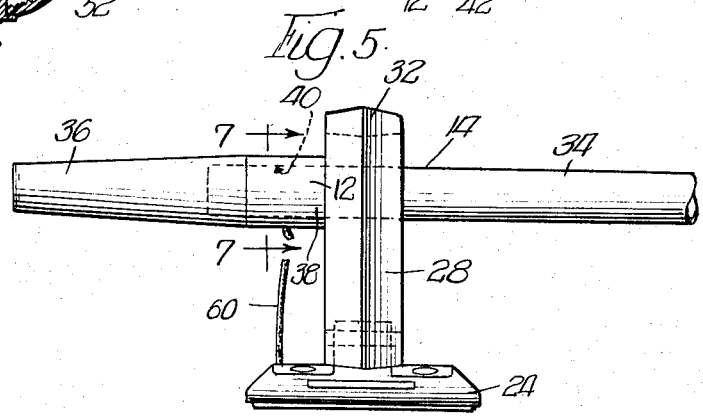
Inventor:
Louis E. Gross,
By Hume, Groen, Clement + Hume
Attys.

United States Patent Office 3,375,365
Patented Mar. 26, 1968

3,375,365
AUTOMOBILE LIGHT
Louis E. Gross, Chicago, Ill., assignor to Unity Manufacturing Company, Chicago, Ill., a corporation of Illinois
Filed Oct. 12, 1965, Ser. No. 495,277
3 Claims. (Cl. 240—7.1)

ABSTRACT OF THE DISCLOSURE

An automobile light which is mounted to a luggage carrier rack unit adapted to mount to the roof of an automobile. The light includes an elongate bar normally extending substantially horizontally and pivotable into a vertical position.

---

The present invention relates to automobile lights and more particularly to an automobile light integral to an automobile luggage carrier.

A major safety deficiency in present automotive design is that all of the rear lights, such as the tail lights, brake lights and turn indicator lights, are mounted at a relatively low position on the automobile. In congested traffic these lights are only visible to the immediately following vehicle. This is particularly hazardous under modern freeway conditions where it is a casual factor in multiple vehicle rear end collision accidents. The low positioning of the rear lights is also a factor in the safety problem associated with vehicles parked or disabled at the side of the highway. It is clear that rear lights are more appropriately located above the top of the vehicle. However, there has been a problem in providing a suitable light and mounting structure therefor for such a car-top mounting.

It is a general object of the present invention to overcome the above and other problems.

It is a further object of the present invention to provide a novel automobile light adapted to serve as a disabled vehicle light.

It is another object of the present invention to provide a novel automobile light adapted to light a luggage carrier for assistance in loading the luggage carrier.

It is an object of the present invention to provide a novel automobile light which is a component of an automobile luggage rack, and is carried thereby above the top of an automobile for greatly improved visibility.

The invention, together with further objects and advantages thereof will be better understood by reference to the following description taken in connection with the accompanying drawings, in which:

FIG. 1 is a rear view of an exemplary automobile light assembly in accordance with the present invention;

FIG. 2 is a plan view of the automobile light assembly of FIG. 1;

FIG. 3 is a rear view of one of the automobile lights of FIGS. 1-2;

FIG. 4 is a plan view of the automobile light of FIG. 3;

FIG. 5 is a side view of the automobile light of FIGS. 3-4;

FIG. 6 is a cross-sectional view taken along the line 6—6 in FIG. 3; and

FIG. 7 is a cross-sectional view taken along the line 7—7 in FIG. 5.

Turning now to the drawings and referring specifically to FIG. 1 there is shown therein an automobile light assembly 10 including a pair of light bars 12 and 12' forming a part of the rear of automobile luggage rack sections 14 and 14' and supported thereby spaced above an automobile roof 16. It may be seen that the light bars 12 and 12' are preferably rotatably mounted so that either or both may be rotated from a normal horizontal position to a vertical position.

Considering the rack sections 14 and 14', they together define an automobile luggage carrier. Each rack section preferably provides the sole support and mounting for one of the light bars and supports the light bar in spaced relationship above the automobile roof 16. Preferably the two separate allochiral rack sections 14 and 14' each are adapted to separately mount to the automobile roof 16. The mounting base preferably includes a plurality of elongate roof top runners 20, a flexible transverse base strip 22 connecting the runners, and a mounting bracket 24 at each end of the base strip 22. Preferably each rack section includes four identical mounting brackets 24, one at the inside and one at the outside of the rack section at each end thereof. Extending vertically from each mounting bracket 24 is a stanchion. Preferably there are two inner stanchions 26 located at the inside of the rack section at the front and rear thereof. Two outer stanchions 28 are located at the outside of the rack section at the front and rear thereof.

Preferably integral with and extending between each inner stanchion 26 and each outer stanchion 28 is a horizontal luggage retaining rail. Preferably there is a front retaining rail 30 extending across the front of the rack section and a rear retaining rail 32 extending across the rear of the rack section. It may be seen that the rear retaining rail 32 is spaced substantially above the automobile roof top and parallel thereto, transverse the automobile roof.

Each rack section preferably has a side retaining rail 34 which extends along only the outside thereof. In the disclosed embodiment the side retaining rail 34 is defined by an elongate tubular member which extends between and connects with the upper ends of the outer stanchions 28. Preferably an end of the side retaining rail 34 extends a substantial distance beyond (to the rear of) the rearmost outer stanchion 28. A decorative end cap 36 is preferably fixed over this extending end of the side retaining rail 34.

Turning now to the light bar 12, it is preferably identical to, or a mirror image of, the light bar 12'. Preferably the light bar 12 has an elongate streamlined and low profile configuration, so as to provide an elongate light area with a minimum of wind resistance and vibration. An outside end 38 of the light bar is preferably adapted to pivotally mount to the outside rear of each of the rack sections. This is preferably provided by having in the outside end 38 a cylindrical aperture 40 perpendicular the elongate dimension of the light bar. The aperture 40 has an internal diameter corresponding to the outside diameter of the rearwardly projecting end of the side retaining rail 34 so that the aperture 40 may be slidably mounted over this projecting end. Accordingly, the entire light bar is rotatable about its outside end 38 at the outside of the rack section 12. As may be particularly seen in FIG. 7, the outside end 38 of the light bar may be provided with a resilient arcuate leaf spring 42 which projects into the cylindrical aperture 40. This or other suitable structures provide a means for frictionally maintaining the light bar in any rotatable position to which it is moved, and in particular, serves to retain the light bar in a vertical position when it is rotated thereto.

The light bar 12 is preferably axially retained on the side retaining rail 34 by the end cap 36 which fits over and is secured to the outermost end of the side retaining rail 34. The outside end 38 of the light bar is thus held between the end cap 36 and the outer stanchion 28 through which the side retaining rail 34 projects. In its normal horizontal position the light bar is slightly below, parallel, and slightly to the rear of the rear retaining rail 32 and therefore protected by the rear retaining rail.

Considering now the inside end 46 of the light bar 12, this end is preferably provided with releasable securing or locking means for rigidly connecting the inside end of the light bar to the inside of the rack section 14 at the inner stanchion 26, and thereby maintaining the light bar in its normal horizontal position. Exemplary securing means illustrated herein comprise a bolt 48, which has a knurled head so that it may be hand tightened. The bolt 48 extends through the inside end 46 of the light bar and screws into the inner stanchion 26. A good securing means to maintain the light bar in its horizontal position is important since the light bar is subject to considerable vibration from wind and road noise.

Considering the principal portion of the light bar extending between its inside end 46 and its outside end 38, a preferred configuration includes an elongate continuous I-beam member 50, illustrated in cross-section in FIG. 6. The I-beam member 50 provides structural integrity for the light bar and also serves to retain the lenses and provides mountings for the electrical lights therein.

The preferred lighting arrangement in the light bar 12 preferably includes a pair of elongate translucent windows extending continuously along the front and rear sides thereof over substantially the entire length of the light bar. As particularly shown in FIG. 6 there is preferably a translucent white lens 54 enclosing the rear surface of the light bar and a corresponding red or amber lens 56 enclosing the front surface of the light bar. Both lenses are preferably generally oval or semi-circular in shape and may be extruded Plexiglas, Lucite or other suitable material. Preferably both lenses have elongate stratifications in the internal surfaces thereof to diffuse or evenly spread the light projected therethrough along the light bar, thereby providing the appearance of an even light source along the entire length of the bar. The white lens 54 provides a white working light forward on the automobile which lights the entire luggage carrier enabling the luggage carrier to be easily loaded or unloaded at night. The red lens 56 provides a highly visible rear light for the vehicle. Preferably both lenses are constructed so that the opposite edges thereof are secured under the opposite flange portions of the I-beam member 50, abutting the web portion, as may be clearly seen from FIG. 6. Screws or other suitable fastening means may be employed to hold each lens against the I-beam member 50.

The exemplary electrical light structure for the light bar 12 disclosed herein comprises a plurality of evenly spaced electric lights 58 adapted to connect with the automobile electrical system. The lights 58 may employ conventional automobile lamps or other suitable light sources. The connection to the automobile electrical system may be provided by the electrical wire 60 extending from the outside end 38 of the light bar through the automobile roof 16. Preferably each of the lights 58 is located in one of a plurality of spaced apertures 52 in the web of the I-beam member 50. Accordingly, the light produced by each light 58 projects simultaneously through the white lens 54 and the red lens 56.

It will be appreciated that the lights 58 may be variously connected to the automobile electrical system. For example, the lights 58 may all be connected to provide tail lights, brake lights or turn indicator lights. It is also possible to connect various combinations of individual lights 58 to provide a combination of the above functions.

The automobile light assembly 10 provides a highly visible disabled vehicle warning light. By simply unfastening the bolt 48 and tilting one or more of the light bars to a vertical position as indicated in FIG. 1, a highly visible extended vertical column of light is provided extending vertically upward from the automobile roof. Where the lights 58 are connected to the turn indicator control this vertical column light may be made to flash, providing additional visual indication.

In view of the foregoing description it is clear that there has been provided herein a new and improved light assembly providing greatly improved visibility and safety and other advantages as described hereinabove. While the embodiment described herein is at present considered to be preferred it will be understood that numerous variations and modifications may be made therein by those skilled in the art, and it is intended to cover in the appended claims all such variations and modifications as fall within the true spirit and scope of the invention.

What is claimed is:
1. In combination:
  a luggage carrier rack adapted to mount to the top of an automobile
  said luggage carrier rack having two separate rack sections, each said rack section having a front and rear, an inside, an outside and mounting base means for mounting said rack sections to an automobile roof;
  an elongate bar extending across the rear of each of said rack sections spaced above said mounting base means, said bar having first and second ends;
  said first end of said bar being rotatably mounted to said rack section adjacent said outside thereof;
  said bar being integrally rotatable about said first end thereof into a vertical position;
  means for holding said bar in a vertical position;
  releasable securing means connecting said second end of said bar to said inside of said rack section;
  at least one translucent window in at least one side of said bar, said translucent window defining an automobile rear light lens;
  and electric light means in said bar for projecting light through said translucent window, said light means being adapted to connect with an automobile electrical system.

2. In combination:
  a luggage carrier rack adapted to mount to the top of an automobile;
  said luggage rack having two separate rack sections, each said rack section having a front and rear, an inside, an outside and mounting base means for mounting said rack section to an automobile roof;
  a rear retaining rail along said rear of said rack section spaced above said mounting base means;
  an elongate bar extending across the rear of each of said rack sections adjacent said rear retaining rail, said bar having first and second ends;
  said first end of said bar being rotatably mounted to said rack section adjacent said outside thereof;
  said bar being integrally rotatable about said first end thereof into a vertical position;
  means for holding said bar in a vertical position;
  releasable securing means connecting said second end of said bar to said inside of said rack section;
  a first elongate translucent window in one side of said bar extending over the principal portion thereof, said translucent window defining an automobile rear light lens and having integral light diffusing means for elongate distribution of light projected therethrough;
  a second translucent window in said bar opposite said first window;
  and electric light means in said bar for projecting light through both said first and second translucent windows, said light means being adapted to connect with an automobile electrical system.

3. In combination:
  a luggage carrier rack unit adapted to mount to the top of an automobile;
  said luggage carrier rack unit having front, rear and side portions and means for mounting said rack unit to an automobile roof;
  an elongate bar extending substantially horizontally at the rear portion of said luggage carrier rack unit and spaced above said mounting means, said bar having first and second ends;
  said first end of said bar being rotatably mounted to said luggage carrier rack unit;

said bar being integrally rotatable about said first end thereof into a vertical position;

releasable securing means connecting said second end of said bar to said luggage carrier rack unit;

at least one translucent window in at least one side of said bar, said translucent window defining an automobile rear light lens;

and electric light means in said bar for projecting light through said translucent window, said light means being adapted to connect with an automobile electrical system.

References Cited
UNITED STATES PATENTS

| | | | |
|---|---|---|---|
| 1,579,855 | 4/1926 | Beyer | 240—8.22 |
| 2,251,050 | 7/1941 | Hagerty et al. | 240—7.1 X |
| 2,584,292 | 2/1952 | Rogers | 240—7.1 X |
| 2,843,729 | 7/1958 | Materese | 240—7.35 |
| 3,223,302 | 12/1965 | Helm | 224—42.1 |
| 3,281,030 | 10/1966 | Gosswiller | 224—42.1 |
| 3,287,548 | 11/1966 | Kompier | 240—7.1 |

NORTON ANSHER, *Primary Examiner.*